Oct. 27, 1931.　　　J. A. MAYNARD　　　1,829,567
VACUUM RELIEF VALVE
Filed June 4, 1928
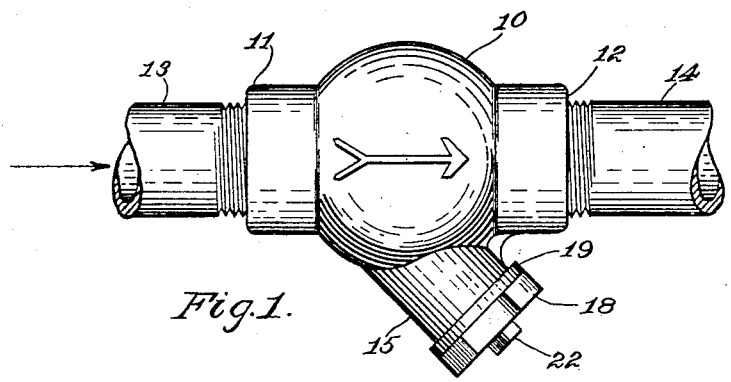
Fig. 1.
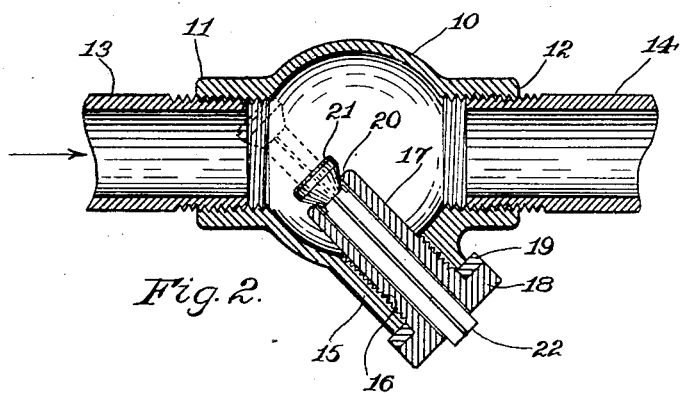
Fig. 2.
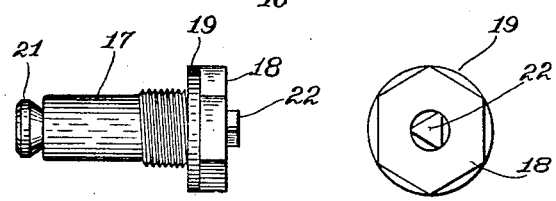 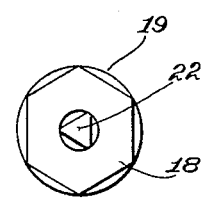
Fig. 3.　　　Fig. 4.
Inventor:
Joseph A. Maynard
By Macleod Calver Copeland & Sike
Attorneys.

Patented Oct. 27, 1931

1,829,567

UNITED STATES PATENT OFFICE

JOSEPH A. MAYNARD, OF BOSTON, MASSACHUSETTS

VACUUM RELIEF VALVE

Application filed June 4, 1928. Serial No. 282,584.

This invention relates to vacuum relief valves adapted to be placed in the water supply lines for boilers and the like to permit the entrance of air into the system when an excess vacuum is created which otherwise might collapse the boiler.

It is an object of the present invention to provide a vacuum valve of this general type which is constructed and arranged so that it may be positively closed by the inflow of water and maintained closed by the pressure thereof, but which may be readily opened by an excess vacuum in the system and also by the reverse flow of water.

It is a further object of the invention to provide a device containing a unit valve construction in which a valve is arranged so that it cannot be displaced accidentally when in service but can be readily removed with the unit.

With these objects in view a device is provided having a fluid inlet and outlet adapted to be connected in the water supply line. This device has a casing provided with an opening having walls inclining towards the inlet to hold an outwardly closing valve at an inclination thereto. Preferably, the valve is arranged in a unit construction comprising a removable sleeve adapted to be inserted in the opening in the casing and containing a valve adapted to seat upon the inner end of the sleeve.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

This invention will be more clearly understood from the following description in conjunction with the accompanying drawings; in which:

Fig. 1 is an elevational view of a fitting embodying the invention.

Fig. 2 is a sectional elevational view of the same; and

Figs. 3 and 4 are elevational and end views respectively of the valve unit.

A suitable fitting embodying the valve construction of the invention is illustrated in the drawings and comprises a casing 10 having an inlet 11 and an outlet 12 which are connected with the sections 13 and 14 of a water supply line of a steam boiler or the like. The casing 10 is provided with a branch 15 having an opening 16 with walls inclining towards the inlet 11. In the construction illustrated, the opening 16 is threaded to receive a valve arranged in a unit construction comprising a sleeve 17 having a flange 18 at its outer end adapted to engage a washer 19 and press the same against the outer end of the branch 15. The sleeve 17 is provided at its inner end with a knife edge valve seat 20 adapted to receive a valve 21 having a tapered head and provided with a relatively long valve stem 22 extending into the sleeve 17 and adapted to guide the valve against the valve seat. Preferably, the valve stem 22 is constructed to have a polygonal cross section to provide a plurality of lines of contact with the sleeve 17 and thereby reduce the friction therebetween. Suitable means are provided for preventing accidental displacement of the valve 21 when in use. For this purpose in the construction illustrated, the valve stem 22 is constructed of a length greater than the distance from the valve seat 20 to the opposite wall of the fitting.

When water enters the system in the direction indicated by the arrow in either Figs. 1 or 2, the valve 21 is closed positively against the seat 20 and the pressure of the water maintains the valve closed. On the other hand if an excessive vacuum is created in the system the valve is opened permitting air to enter through the opening 16 into the system and thus relieve the vacuum and the strain upon the boiler. The inclination of the valve towards the water inlet assures closing of the valve as soon as water enters the system and greatly assists opening of the valve by the vacuum. The construction is such that the valve cannot be tampered with, nor removed without removing the entire unit. The device will operate satisfactorily if placed in the water supply line in any position in either a vertical or horizontal plane.

It will be noted that the present invention provides a structure in which the valve 21 is not only actuated by vacuum or suction within the system but is also a flow actuated valve. The valve 21 in the present case extends into the path of the stream of water flowing through the conduit 13, 14, and this stream of water, flowing in either direction, at all times contacts with the valve 21 in such manner as to assist in actuating the same. When the water flows in the direction of the arrow in Fig. 2, it strikes the inclined head of the valve and forces it against its seat. When the water flows in the opposite direction it strikes the under side of the valve head and assists in forcing it off its seat. This flow actuation of the valve is in addition to the vacuum or suction actuation thereof, so that there is provided a combined vacuum and flow actuated valve.

What I claim is:

1. A vacuum relief device for a water pipe line having a chamber, a vacuum valve, a removable valve member threaded through a wall of said chamber at an oblique angle to the pipe line and having at its inner end within the chamber a seat for supporting said valve in position to be opened and closed by the flow of water, the opposite wall of the chamber forming a stop for limiting the outward movement of the valve, and means for supporting the valve in said valve member in any position of the valve.

2. A relief device for a water supply line or the like, comprising a casing having an inlet and an outlet and a passage for the flow of fluid therebetween, and a vacuum valve extending into said passage and facing angularly toward said inlet, said valve being positively actuated by the flow of fluid to assist in opening and closing the same.

3. A vacuum relief device comprising a casing insertable in a water pipe line, said casing having alined oppositely disposed inlet and outlet openings and a chamber therebetween, said casing also having a boss provided with an angularly extending threaded opening, a removable sleeve threaded into said opening and terminating within said chamber, said sleeve extending angularly toward the inlet opening and having a valve seat disposed within the chamber substantially in line with the inlet and outlet openings, a vacuum valve carried by said sleeve and normally seated on said valve seat in position to be positively actuated by the flow of fluid through the chamber, means for limiting the outward movement of the valve in the direction of the inlet opening, and means for supporting the valve in said sleeve in any position of the valve.

In testimony whereof I affix my signature.

JOSEPH A. MAYNARD.